July 19, 1932. C. H. SCHURR Re. 18,532

GEAR GRINDING MACHINE

Original Filed Feb. 15, 1928 3 Sheets-Sheet 1

Inventor
Charles H. Schurr
By
Hawgood and Van Horn
Attorney

July 19, 1932. C. H. SCHURR Re. 18,532

GEAR GRINDING MACHINE

Original Filed Feb. 15, 1928 3 Sheets-Sheet 2

Inventor

Charles H. Schurr

By Howgood and Van Horn

Attorneys

July 19, 1932. C. H. SCHURR Re. 18,532

GEAR GRINDING MACHINE

Original Filed Feb. 15, 1928 3 Sheets-Sheet 3

Inventor
Charles H. Schurr
By Haugwood and Van Horn
Attorneys

Reissued July 19, 1932

Re. 18,532

UNITED STATES PATENT OFFICE

CHARLES H. SCHURR, OF CLEVELAND, OHIO, ASSIGNOR TO THE LEES-BRADNER COMPANY, OF CLEVELAND, OHIO, A CORPORATION OF OHIO

GEAR GRINDING MACHINE

Original No. 1,751,104, dated March 18, 1930, Serial No. 254,382, filed February 15, 1928. Application for reissue filed March 17, 1932. Serial No. 599,557.

This invention relates to gear grinding machines.

One of the objects of this invention is to provide an improved gear grinding machine of the type in which the gear-to-be-ground or work gear, is rolled on a circle thereof and its teeth faces engage the face of a rotating grinding wheel with an involute generating movement.

Another object is to provide a gear grinding machine of this class having improved indexing means by which the work gear may be accurately and quickly indexed from one tooth to another.

Another object is to provide a gear grinding machine in which the grinding wheel may be set to grind gears of various pressure angles; and in which the wheel may be set with its face parallel to the rotational axis of the work gear to grinding the tooth faces of spur gears; and in which the wheel may also be set with its face at an angle to the said axis to grind the tooth faces of right hand or of left hand helical gears.

Another object is to provide a gear grinding machine which, being adaptable to grind either spur or helical gears, is adaptable to grind both the spur faces and the helical faces of the teeth of gear finishing tools such as are employed in the gear finishing method of my Patent No. 1,642,179, Sept. 13, 1927; and which tools are fully described in my application, Serial No. 159,092, filed Jan. 5, 1927.

Another object is to provide a gear grinding machine in which the generating movement of the work gear relative to the grinding wheel may be that which results from rolling a circle of the work gear on a line without slipping, whereby to generatively grind gear teeth with true involute faces; and which may be adapted to give to the work gear the generative movement which results from rolling a circle of the gear on a line and concurrently moving the line in its own direction whereby to generatively grind on the gear tooth faces non-involute or modified involute profiles, the curve of which deviates from a true involute; and in which such modified involute curve may comprise a true involute section and another curved section merging into each other without intersection; and in which these modified involute profiles may be ground on spur gears, or on helical gears, or on combinations thereof such as on the tools above mentioned.

Other objects will be apparent to those skilled in the art.

The invention is fully disclosed in the following description of one embodiment thereof, and in the accompanying drawings illustrating this embodiment, in which.

Figure 1:
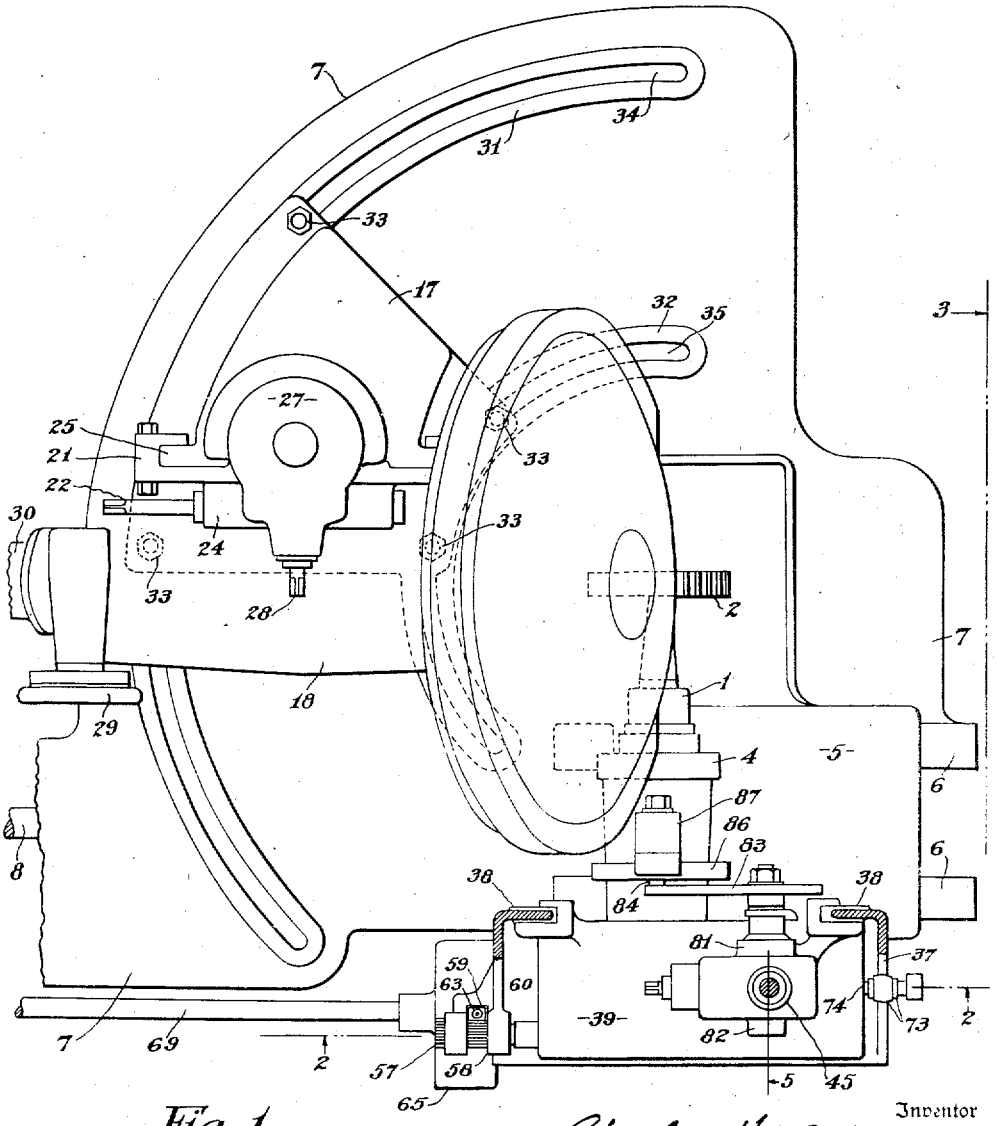
Fig. 1 is a top plan view partly in section and with some of the parts broken away, of my improved gear grinding machine, taken approximately from the staggered plane 1—1 of Fig. 2, or the staggered plane 1—1 of Fig. 3.

A work spindle 1, carrying on one end a work gear or gear to be ground 2, and upon the other end a master gear 3, is mounted for rotary oscillation in a spindle housing 4, carried upon a slide 5 which slide is adapted to be reciprocated upon ways 6—6 formed upon the main frame 7. A push-and-pull rod 8 has one end secured to the slide 5 at 9 and at the other end is connected, by means not shown, to a power device for reciprocating the rod longitudinally to correspondingly reciprocate the slide 5 in a well known manner.

The teeth 10 of the master gear 3 are adapted to mesh with the teeth 11 of a master rack 12 and with the grooves 13 of a normally stationary indexing cam device 14 (to be described); and when the slide 5 is reciprocated, the master gear rolls back and forth (from left to right and vice versa in Fig. 2) on the master rack and indexing cam device 14, and the master gear is thereby given a movement equivalent to rolling a circle of the master gear on a straight line without slipping. This rolling movement is transmitted to the work gear 2. The work gear 2 thus moves as if it were rolling upon an imaginary conjugate rack. The planular face 15 of a rotating grinding wheel 16 is positioned (in a manner to be described) so that this face is coincident with the plane of one of the tooth faces of said imaginary rack. The teeth of the work gear 2 therefore slide upon the face of the grinding wheel with an involute generating movement and the profiles of the work gear teeth are ground to a true involute curvature.

The word "planular" is used in describing the working face of the grinding wheel and this term is used throughout this specification as meaning "capable of defining or producing a plane". The surface defined by the particular wheel illustrated is a plane normal to the axis of the wheel.

Rising from the base 7 of the machine is a column 17 for supporting the grinding wheel 16 in the following manner. The grinding wheel 16 is rotatably mounted on a housing 18, carried upon a head 19 which is adjustable in vertical planes and about a center 20, upon a vertically adjustable slide 21. By means of an operating shaft 22, squared on the end at 23 to receive a tool, gearing contained in a gear housing 24 may be operated to adjustably swivel or rock the wheel housing 18 about the center 20. Coordinate with this adjusting movement of the housing 18, the slide 21, which is mounted upon vertical ways 25—25 on the column 17, may be raised and lowered thereon by a screw 26 supported on the column 17 and adapted to be turned to propel the slide 21 by means of gearing in a gear-housing 27 and by a square-ended operating shaft 28 connected therewith. By raising or lowering the slide 21 and by rocking the head 19 about the center 20 the planular face 15 of the grinding wheel may be adjusted to any desired pressure angle with respect to the work gear, and to operate on any diameter of work gear. To further adjust the position of the grinding wheel, the wheel is movable longitudinally of its axis of rotation by an adjusting hand wheel 29 connected by mechanism (not shown) to a grinding wheel shaft within the housing 18. The grinding wheel shaft within the housing 18 may be driven by a motor 30 secured to the housing 18.

The internal construction of the housing 18 and of the grinding wheel shaft and the mounting and drive therefor, as well as the mechanism for adjustably, axially, positioning the grinding face 15 of the grinding wheel as above referred to, form no essential part of the present invention and any known or suitable construction or mechanism therefor may be employed. Reference may be had to my application, Serial No. 561,219, filed May 15, 1922, a division of which is now Patent No. 1,810,408, issued June 16, 1931, for one type of construction for thus controlling the grinding wheel and it is not deemed necessary to burden the present description with details thereof.

The column 17 rests upon curved, preferably horizontal, ways 31 and 32 on the main frame 7, and is bolted to the frame by bolts 33 extending into curved slots 34 and 35 in the ways 31 and 32. The slots 34 and 35 are constructed preferably with a common center which lies preferably in a vertical line or axis passing through the center of the work gear and preferably also intersecting the rotational axis (extended) of the grinding wheel. With this construction, the column 17 carrying the grinding wheel may be adjustably positioned by sliding it around on the ways 31 and 32 and bolting it in any adjusted position; and as it is adjustably moved from one position to another the grinding wheel will be bodily rotated about the said vertical axis.

When the column is adjusted to such a position that the planular face of the grinding wheel is parallel to the axis of the work spindle, the planular faced wheel may be adjusted to bring its plane into coincidence with one of the tooth faces of the above described imaginary rack upon which a spur type work gear rolls; and when the column is adjusted to some other position, in which the plane of the wheel face is at an angle to the work spindle axis, the wheel face may be adjusted to bring its plane into coincidence with the face of one of the imaginary rack teeth on which a helical work gear rolls.

It will now be clear that the planular face 15 of the grinding wheel 16 may be positionally adjusted with relation to the teeth of the work gear 2 to grind faces thereon which, in the rotational planes of the work gear, are of involute curvature, whether said gear is a spur gear or whether it is a right hand or left hand helical gear. The extent of the adjustability of the column 17 indicated in the drawings is such as to admit of the grinding of helical work gears with a range of helical angle from zero degrees (spur gear) to 45 degrees or more, right or left hand.

In my application, Serial No. 159,090, filed January 5, 1927, now Patent No. 1,745,344, issued January 28, 1930, I describe a gear finishing tool which is in general of gear form, and the teeth of which have faces composed of a spur tooth portion combined with one or more helical portions. It will be apparent that such a gear form tool may be generatively ground upon the machine of this disclosure by successively setting the grinding wheel in the positions to grind spur and helical tooth faces.

By means of the mechanism thus far described, I provide a gear grinding machine for grinding involute faces on either spur or helical gears; and it will be noted that at any helical angle adjustment of the grinding wheel it may be adjusted for pressure angle and work gear diameter independently of the helical angle.

*Indexing mechanism*

Upon a bracket 35 of the main frame 7 is secured, as by bolts 36, a vertical generally rectangular frame 37, angular in cross section. The frame is provided with ways 38—38 upon which is mounted and adapted to be slid adjustably, vertically, an indexing mechanism housing support 39. The support 39 is provided with a pair of horizontal guides 40 in which is suspended the flange ways 41—41 of a reciprocable slide 42 to which is secured as by bolts 43 an index-mechanism-housing 44. The housing 44 is thus carried by the housing support 39 and movable in unison therewith on the ways 38 to change or adjust its vertical position on the machine. To effect this vertical adjustment, a screw 45 is provided, threaded into the frame 37 at 46 and rotatably anchored at 47 in the roof 48 of a chamber 49 in the housing support 39 to be referred to later. The screw 45 is squared at 50 for a tool, and when it is turned, the housing support 39 and the indexing mechanism housing 44 will be adjustably moved vertically. Any known or suitable means not shown may be used to rigidly secure the housing support 39 in any adjusted position on the ways 38.

Figure 5:
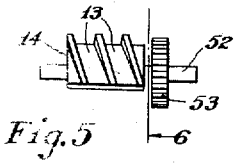
Fig. 5 is a top plan view of a cam device, shown also in front elevational view in Fig. 2.
Figure 6:
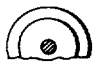
Fig. 6 is a view taken from the plane 6 of Fig. 5.
Figure 4:
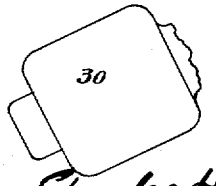
Fig. 4 is a view taken similarly to Fig. 2 and showing a motor which is broken away from Fig. 2.
Figure 3:
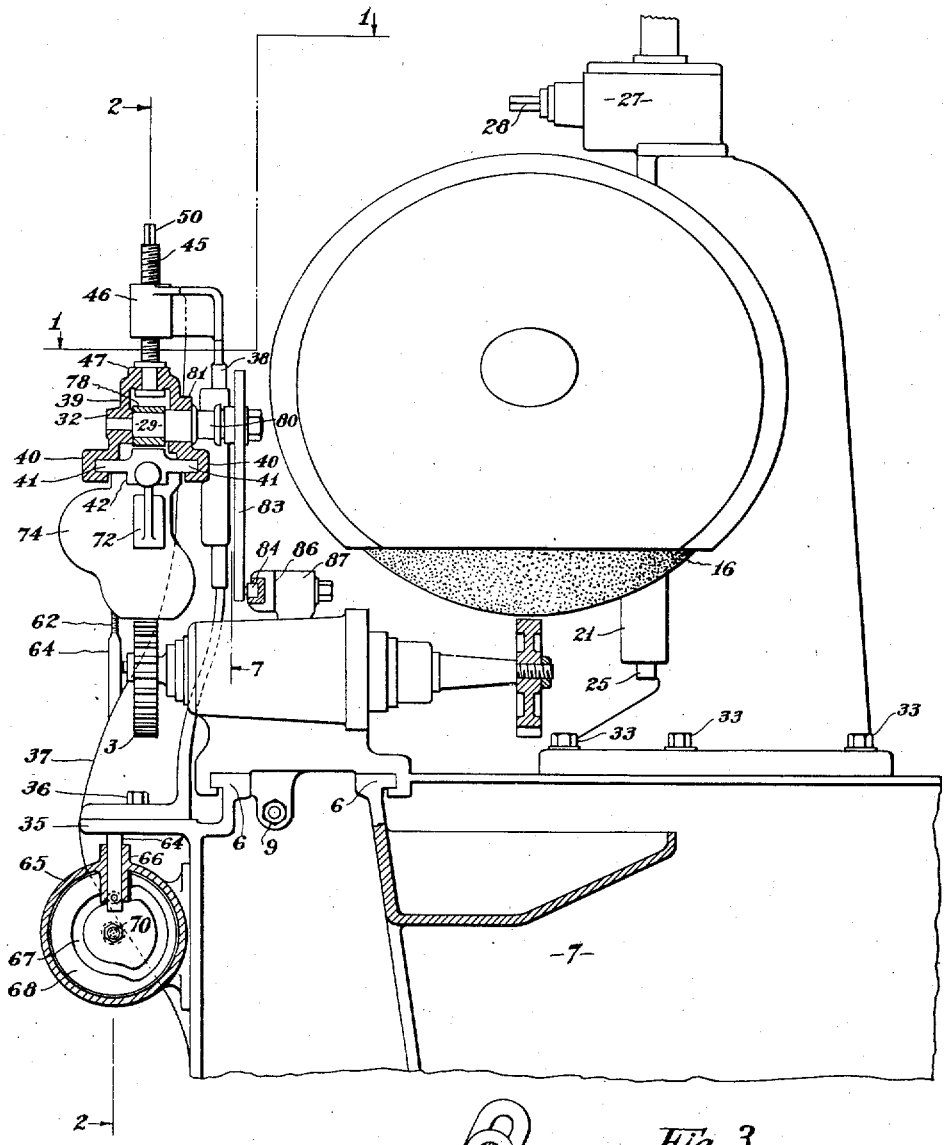
Fig. 3 is a front elevational view partly in section and with some of the parts broken away and taken generally from the staggered plane 3—3 of Figs. 1 and 2.

The master rack 12 is secured, as by bolts 51, to the lower side of the housing 44 as is plainly shown. Mounted rigidly on a horizontal shaft 52 in the housing 44 is an indexing cam device 14 shown in Figs. 2, 5 and 6. The cam device 14 is normally stationary but is adapted to be periodically oscillated through a limited angular movement by its shaft 52. The cam device 14 is generally semi cylindrical in form and has angularly arranged grooves 13 in the curved convex surface thereof which normally form a continuation of the tooth spaces of the rack 12. By a mechanism to be described, when the master gear 3 rolls to the right, (as viewed in Fig. 2) and the teeth 10 of the gear leave the tooth spaces of the rack and enter the grooves 13 of the cam device 14, the cam device thereupon is set in motion and rocked or oscillated in one direction by means of the shaft 52; and the grooves 13 act upon the gear teeth like cams and give a turning movement to the gear 3. The angular direction of the grooves 13 and the circumferential dimensions thereof, and the extent of the oscillatory movement of the cam device 14 are so proportioned that when the cam device has been turned or oscillated through approximately 180 degrees from its initial stationary position, it will have turned the gear 3 ahead one tooth. The movement of the cam device 14 is then stopped by the said mechanism (to be described) with the cam device in a second stationary position, and the gear 3 rolls back upon the rack 12 in indexed relation thereto, and thereupon the cam device 14 is set in motion and oscillated or rocked in the reverse direction back to its original position.

Figure 2:
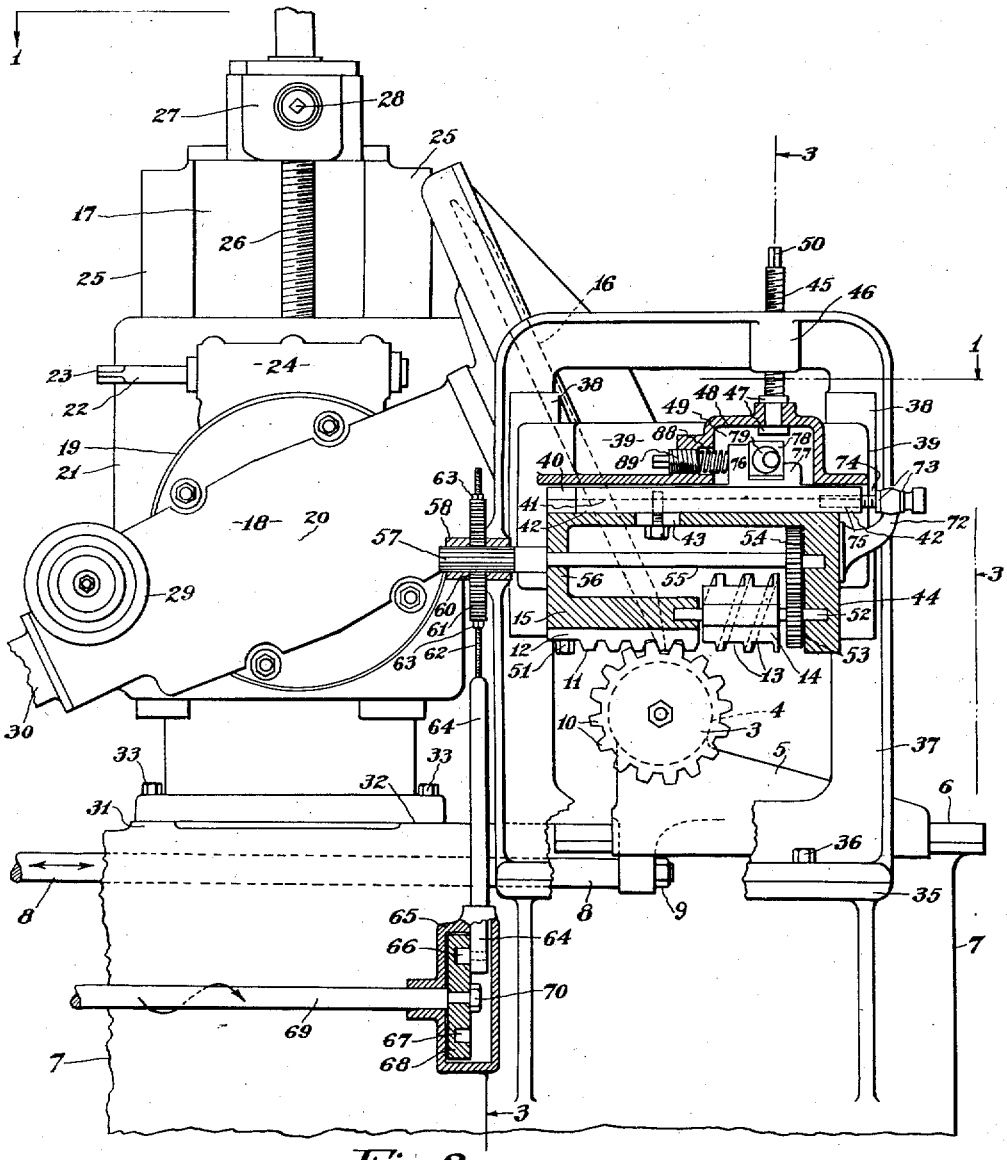
Fig. 2 is a side elevational view partly in section and with some of the parts broken away, taken approximately from the staggered plane 2—2 of Fig. 1 or from the plane 2—2 of Fig. 3.

The mechanism for oscillating the cam device 14 will now be described. Secured to the shaft 52 of the cam device 14 is a gear 53 meshing with another gear 54 which is secured to a transmission shaft 55 mounted in the housing 44. The transmission shaft 55 extends horizontally outwardly through the end wall 56 of the housing 44 and terminates in or is connected to an axially elongated gear or splined element 57. The elongated gear 57 is rotatably mounted in bearings 58 supported by a bracket 59 on the rectangular frame 37. The bracket 59 is provided with a vertically arranged opening or guide 60 through which extends a vertically reciprocable rack 61, the teeth of which mesh with the teeth of the elongated gear 57. The rack 61 has a longitudinal bore through which extends a threaded rod 62; and by means of nuts 63 the vertical position of the rack 61 on the rod 62 may be adjusted in a well known manner. The threaded rod 62 is joined to a rectangular cam-follower-rod 64 extending downwardly therefrom as shown in Fig. 2 and entering a cam housing 65.

The lower end of the rod 64 carries a cam follower or roller 66 adapted to run in the irregular groove 67 of a rotatable cam 68. The groove 67 illustrated, is so shaped that in one rotation of the cam 68 the cam follower rod 64 is given a limited movement upwardly, and then a dwell, and then a corresponding movement downwardly, and then another dwell. The rotatable cam 68 is secured on one end of a rotary drive shaft 69, as by a nut 70, and the shaft 69 is adapted to be rotated continuously in one direction and in timed relation to the reciprocatory movement of the slide 5. The cam 68 illustrated makes one revolution for each complete reciprocatory cycle of the slide. The means for effecting the rotation and timing of the shaft 69 is not shown; any known or suitable means may be employed; but I prefer the means shown and described in my application, Serial No. 141,707, filed October 15, 1926. It will now be apparent that by means of the cam 68, the rack 61 is periodically given a reciprocatory movement which oscillates the shaft 55, gears 54 and 53, and cam device 14; and that by properly shaping the cam groove 67 and properly timing the rotation thereof, the oscillatory movement of the cam device 14 may be caused to begin when the master gear 3 is on the cam device 14 and at a point of the reciprocatory stroke of the slide 5 suitable and desirable for indexing; and may be caused to stop moving at a point of the slide stroke suitable for permitting the master gear to remesh with the master rack 12 on its return movement.

The work gear 2 may be secured on the work spindle 1 in any known or suitable manner; in the drawings the gear is shown mounted on a reduced threaded portion and secured by a nut 71. If desired, the work gear may be keyed or otherwise angularly positioned on the work spindle in a predetermined angular relation thereto and in such cases in settting up the machine it is often desirable to adjustably shift the rack 12 longitudinally to position the work gear relative to the grinding wheel. To effect this adjustment the following means is povided. On the right hand end (as viewed in Fig. 2) of the indexing housing 44 is mounted a bracket 72 carrying a horizontally arranged hand operated propelling screw 74 anchored in the bracket at 73 and threaded into the slide 42 at 75. By loosening the bolt 43 and turning the screw 74, the housing 44 may be adjustably propelled to the right or to the left (in Fig. 2) to adjustably position the rack 12, and in any adjusted position the housing may be securely fixed by tightening the bolt 43.

It is preferably to have the master gear 3 of substantially the same diameter as the work gear 2, and therefore when different sizes of work gear 2 are to be ground, it is desirable to raise or lower the rack 12 to adapt it to the corresponding different sizes of the master gears. To effect this adjustment, the screw 45 above described may be turned which will move the housing 44 vertically. Obviously the elongated gear 57 moves vertically with the housing 44, and to accommodate the rack 61 to the different positions of the gear 57, the rack 61 is made vertically adjustable on the threaded rod 62 as above described.

*Grinding modified profiles*

As is well known it is sometimes desirable to accurately grind the faces of gear teeth to conform to a profile curvature which is not a true involute but is a deviation from or modification thereof. In the gear grinder shown herein, means, which will now be described, is provided for giving to the work gear a movement supplemental to its rolling movement on a line, a supplemental movement which is equivalent to moving longitudinally the line on which a circle of the gear rolls, during a part of the rolling movement. The gear is thus caused to roll on a line without slipping during a portion of its tooth face generating movement and during this portion a true involute is generated; but at a preselected point in the generating movement, the line on which the gear rolls is moved longitudinally so that from that point on, the profile curvature deviates from a true involute. The profile thus generated consists of an involute portion which merges into another curved portion preferably without intersecting it.

A method and mechanism for generating modified or non-involute profiles employing this principle in general is fully shown and described in my application, Serial No. 209,216, filed July 29, 1927, in connection with spur gears. Reference may be had thereto for a more compete discussion of the details of such a method and it is deemed unnecessary to expand the present description therewith. In the machine under discussion here, the underlying principle of that method is embodied in the following mechanism.

Figure 7:
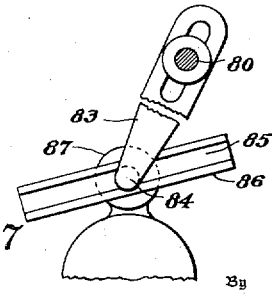
Fig. 7 is a fragmentary view taken from the plane 7 of Fig. 3.

As above described the reciprocable slide 42 has ways 41 horizontally reciprocable, (from side to side in Fig. 2) in guides 40 on the housing support 39. Rising from the slide 42 is a pair of abutments 76 and 77 between which floats vertically a block 78 bored out to receive an eccentric or rotary cam 79 by which the block is supported. The cam 79 is mounted on a shaft 80 (with which it may be formed integrally) and rotates about the axis of the shaft in bearings 81 and 82 formed in and stationary upon the housing 39. The cam shaft 80 carries on its outer end a depending arm 83. On the lower or free end of the arm (Fig. 7) is a roller or cam follower 84, adapted to travel in a cam groove 85 of a cam 86. The cam 86 is made in the form of a channel bar mounted on a post 87, upon the upper side of the spindle housing 4 on the slide 5.

In operation, when the carriage 5 slides, say, to the right in Fig. 2, the cam 86 moves with it bodily and depresses the roller 84 giving a counterclockwise movement to the end of the arm 83 which causes it to act as a crank and turn the cam shaft 80. This turns the cam 79 giving to the block 78 a horizontal movement to the right which is transmitted through the abutments to the slide 42 and thence through the housing 44 to the rack 12 giving to the rack, movement longitudinally.

This movement of the rack is transmitted to the master gear 3 in mesh therewith and is the supplemental involute-modifying movement hereinbefore referred to. Thus as the master gear 3 rolls on the rack 12, the rack, at a certain point in the rolling movement, is given a longitudinal movement by which the master gear and consequently the work gear 2 is given a supplemental rotary movement; and this supplemental movement of the work gear causes it to slide on the grinding wheel in a manner to generate a profile which deviates from the true involute. Preferably I hold the abutment 76 rigidly against the block 78 by a compression spring 88 one end of which abuts against the abutment 76 and the other end against the end of an adjusting screw 89 mounted in a suitably positioned boss in the wall of the chamber 49 on the housing support 39. The thrust of the spring 88 is taken up by the bearings 81 and 82 which support the cam shaft 80.

The cam 79, the depending arm 83 and cam 86 may all be modified, or may be adjusted relatively to each other as described in the above mentioned application, Serial No. 209,216, to produce involute profiles or any of the various types of modified involute profiles shown and described in said application, as well as others not shown.

It will now be clear that by means of a machine described hereinbefore, I may grind spur gears or right hand or left hand helical gears, the tooth profiles of which in the rotational planes of the gear may be of modified involute curvature, deviating from a true involute. In my application Serial No. 212,156 filed August 11, 1927, I describe a gear finishing method in which a tool in general of gear form is employed, the teeth of which have faces composed of a spur tooth portion combined with one or more helical portions and the profile curve of each of which is composed of a true involute portion combined with and in some cases merging, without intersection, into another curved portion; and it will now be apparent that such a gear form tool may be generatively ground on the machine described hereinbefore by successively setting the grinding wheel in the positions to grind modified involute spur and modified involute helical tooth faces; and if desired the involute modification of the helical portion may be the same as that of the spur portion.

I claim:

1. In a gear grinding machine, a main frame, a grinding wheel supporting column on the frame, a planular faced grinding wheel rotatably mounted on the column, ways on the frame, a reciprocable slide on the ways, a work spindle rotatably mounted on the slide, means for reciprocating the slide and oscillating the work spindle to cause a work gear mounted on the work spindle to roll on an imaginary conjugate rack, means for adjustably moving the column on the frame and for adjustably moving the planular face of the grinding wheel on the column to bring the wheel plane into coincidence with a tooth face of an imaginary right hand or left hand helical rack of helical angle from zero degrees upward.

2. In a gear grinding machine, a main frame, a grinding wheel supporting column on the frame, a planular faced grinding wheel rotatably mounted on the column, ways on the frame, a reciprocable slide on the ways, a work spindle rotatably mounted on the slide, means for reciprocating the slide and oscillating the work spindle to cause a work gear mounted on the work spindle to roll on an imaginary conjugate rack, means for adjustably moving the column on the frame and for adjustably moving the planular face of the grinding wheel on the column to bring the wheel plane into coincidence with a tooth face of an imaginary right hand or left hand helical rack of helical angle from zero degrees upward, the said column adjusting means including a curved guide way for the column on the frame.

3. In a gear grinding machine, a main frame, a grinding wheel supporting column on the frame, a planular faced grinding wheel rotatably mounted on the column, ways on the frame, a reciprocable slide on the ways, a work spindle rotatably mounted on the slide, means for reciprocating the slide and oscillating the work spindle to cause a work gear mounted on the work spindle to roll on an imaginary conjugate rack, means for adjustably moving the column on the frame and for adjustably moving the planular face of the grinding wheel on the column toward and from the work gear and to vary its pressure angle, whereby to bring the wheel plane into coincidence with a tooth face of an imaginary right hand or left hand helical rack of helical angle from zero degrees upward, the said column adjusting means including a curved guide way for the column on the frame, circular about an axis through the center of the work gear.

4. In a gear grinding machine for grinding helical gears of helical angle from zero upward right or left hand, a main frame, a column on the frame, a planular faced grinding wheel rotatably mounted on the column, a work spindle rotatably mounted on the frame, means for reciprocating and oscillating the work spindle to cause a work gear mounted thereon to roll upon an imaginary helical rack, means for moving the planular face of the grinding wheel to bring it into coincidence with a tooth face of the imaginary rack, and means for moving the column on the base to move the grinding wheel bodily in a circular path about an axis in a plane through the center of the work gear and at right angles to the gear axis to vary the helical angle.

5. In a gear grinding machine, a main frame, a column on the frame, a planular faced grinding wheel rotatably mounted on the column, ways on the frame, a reciprocatory slide on the ways, a work spindle rotatably mounted on the slide, a master spur gear on the work spindle, a master rack conjugate to the master gear supported on the frame, means for reciprocating the slide to cause the master gear to roll on the master rack and for thus causing a work gear mounted on the work spindle to roll upon an imaginary conjugate rack, means comprising a circular guide way on the frame for moving the column on the frame to move the grinding wheel bodily on a circular path about an axis in a plane through the center of the work gear and at right angles to the gear axis whereby to bring the planular face of the grinding wheel into coincidence with a tooth face of various imaginary racks bearing helical angles from zero upwards, right or left.

6. In a helical gear grinding machine, a main frame, a planular faced grinding wheel rotatably mounted on the frame, a work spindle, means for reciprocating and oscillating the work spindle to cause a helical work gear mounted thereon to move with a rolling movement equivalent to rolling on an imaginary helical rack conjugate thereto, means for adjustably moving the grinding wheel to bring its planular face into coincidence with a tooth face of said imaginary rack, whereby the rolling movement of the work gear may cause the wheel to generatively grind an involute tooth face thereon, and means for concurrently giving a supplemental rotary movement to the helical work gear to cause a part of the tooth face ground thereon to be of modified involute curvature.

7. In a helical gear grinding machine, a main frame, a planular faced grinding wheel rotatably mounted on the frame, a work spindle, means for reciprocating and oscillating the work spindle to cause a helical work gear mounted thereon to move with a rolling movement equivalent to rolling on an imaginary helical rack conjugate thereto, means for adjustably moving the grinding wheel to bring its planular face into coincidence with a tooth face of said imaginary rack, said means including means for moving the wheel toward and from the work gear and for varying the pressure angle of the wheel and for revolving it bodily about an axis in a plane thru the gear center and at right angles to the gear axis, whereby the rolling movement of the work gear may cause the wheel to generatively grind an involute tooth face thereon, and means for concurrently giving a supplemental rotary movement to the helical work gear to cause a part of the tooth face ground thereon to be of modified involute curvature, said supplemental movement being equivalent to that which would result from moving the imaginary rack longitudinally.

8. In a helical gear grinding machine, a main frame, a column on the frame, a planular faced grinding wheel rotatably mounted on the column, ways on the frame, a slide on the ways, a work spindle rotatably mounted on the slide, a master rack on the frame, a master gear on the work spindle meshing with the rack and adapted to be rolled thereon by reciprocation of the slide and to give to a helical work gear mounted on the work spindle the movement of rolling on an imaginary conjugate helical rack, means for adjustably moving the planular face of the grinding wheel on the column, and for adjustably moving the column on the frame in a curved path whereby to bring the planular face of the grinding wheel into coincidence with a tooth face of the imaginary rack at any helical angle thereof from zero upwards right or left, means for reciprocating the slide to cause the teeth of the work gear to slide upon the face of the grinding wheel with an involute generating movement and means for concurrently longitudinally moving the master rack on the frame to cause the work gear teeth to move upon the face of the grinding wheel with a non-involute generating movement.

9. In a gear grinding machine, a main frame, ways on the frame, a reciprocatory slide on the ways, a work spindle on the slide, a master gear on the work spindle, a master rack on the frame, a normally stationary movable cam device on the frame, angularly disposed cam grooves on the cam device disposed, when in said normally stationary position, to form a continuation of the rack tooth spaces, means for reciprocating the slide in one direction to cause the master gear to roll on the master rack and to cause its teeth to roll from the tooth spaces of the rack into the grooves of the cam device, means for then moving the cam device to a second stationary position in which the grooves form again a continuation of the rack tooth spaces, and the extent of said movement of the cam being arranged to rotate the master gear one tooth pitch, whereby the master gear may roll back upon the rack on the return reciprocatory movement of the slide and in indexed relation thereto.

10. In an indexing mechanism, a work spindle, a master gear on the work spindle, a master rack upon which the master gear is adapted to be rolled back and forth, a normally stationary cam device adapted to be moved in a predetermined direction, cam grooves in the device disposed at an angle to its direction of movement, the cam device being positioned relatively to the rack so that in said stationary position the grooves form a continuation of the tooth spaces of the rack, means for rolling the master gear in one direction from the rack on to the cam device, means for moving the cam device to a second stationary position in which the grooves again form a continuation of the rack tooth spaces, and for causing the cam grooves to rotate the master gear one tooth pitch, and means for rolling the master gear in the other direction back upon the rack in indexed relation thereto, and means for returning the cam device to its original stationary position.

11. In an indexing mechanism, a work spindle, a master rack upon which the master gear is adapted to roll back and forth, a cam device oscillatable about an axis of rotation, a cylindrical portion on the device co-axial with its rotational axis, helical grooves in the cylindrical portion, a normally stationary position for the device in which said grooves form a continuation of the tooth spaces of the rack, means for rolling the gear from the rack on to the cam device, means for then oscillating the cam device about its axis to a second stationary position in which the grooves again form a continuation of the rack tooth spaces, the extent of movement and the angle of the grooves being such as to thereby rotate the master gear through one tooth pitch, means for rolling the master gear back upon the rack in indexed relation thereto and means for oscillating the cam device back to its original stationary position.

12. In a gear grinding machine, a main frame, ways on the frame, a slide on the ways, a work spindle on the slide, a master gear on the work spindle, a master rack on the frame, the master gear being adapted to roll to and fro on the rack when the slide is reciprocated, a cam device oscillatable about an axis of rotation from one stationary position to another, a cam groove in the cam device which in the first stationary position forms a continuation of the master rack tooth spaces, means for periodically oscillating the cam device and for reciprocating the slide in timed relation whereby the master gear is caused to roll in one direction from the master rack on to the cam device in its first stationary position, and the cam device is then oscillated to its second stationary position to cause the cam groove to turn the master gear through one tooth pitch, and the master gear is then rolled back upon the master rack in indexed relation thereto, and the cam device is then oscillated back to its original stationary position.

13. A gear grinding machine comprising a main frame, horizontal guide ways thereon, a table slidable upon said guide ways, a work spindle journalled on said table, means for reciprocating said table along said guide ways, rotating means including a master rack and a master gear imparting a rolling motion to said spindle as said table is reciprocated, a grinding wheel, a spindle carrying the grinding wheel and supported by the base, and means for relatively adjusting said spindles about a vertical axis.

14. A gear grinding machine comprising a main frame, horizontal guide ways thereon, a table slidable upon said guide ways, a work spindle journalled on said table, means for reciprocating said table along said guide ways, a grinding wheel, a spindle carrying the grinding wheel and supported by the base, a master gear fixed to said work spindle, a master rack meshing with said gear, and means for relatively adjusting said spindles about a vertical axis.

15. A gear grinding machine comprising a main frame, horizontal guide ways thereon, a table slidable upon said guide ways, a work spindle journalled on said table, means for reciprocating said table along said guide ways, a grinding wheel, a spindle carrying the grinding wheel and supported by the base, a master gear fixed to said work spindle, a master rack meshing with said master gear, an indexing member onto which said master gear rolls at one end of the reciprocation of said table, means moving said indexing member to impart a rotational increment to said spindle, and means for relatively adjusting said spindles about a vertical axis.

CHARLES H. SCHURR.